United States Patent
Chang et al.

(10) Patent No.: US 6,754,765 B1
(45) Date of Patent: Jun. 22, 2004

(54) FLASH MEMORY CONTROLLER WITH UPDATEABLE MICROCODE

(75) Inventors: Chao-I Chang, San Jose, CA (US); Ji Yun Zhang, Fremont, CA (US)

(73) Assignee: Integrated Memory Logic, Inc., Campbell, CA (US)

( * ) Notice: Subject to any disclaimer, the term of this patent is extended or adjusted under 35 U.S.C. 154(b) by 376 days.

(21) Appl. No.: 09/855,919

(22) Filed: May 14, 2001

(51) Int. Cl.$^7$ .............................................. G06F 12/00
(52) U.S. Cl. ..................... 711/103; 711/157; 711/164
(58) Field of Search ................................ 711/103, 157, 711/164

(56) References Cited

U.S. PATENT DOCUMENTS

| | | | |
|---|---|---|---|
| 5,606,660 A | * 2/1997 | Estakhri et al. | ............... 714/38 |
| 5,963,142 A | * 10/1999 | Zinsky et al. | .............. 340/5.74 |
| 5,978,591 A | 11/1999 | Bartholomew et al. | ..... 395/712 |
| 5,978,808 A | 11/1999 | Wells et al. | ................. 707/100 |
| 5,987,573 A | 11/1999 | Hiraka | ........................ 711/156 |
| 6,000,006 A | 12/1999 | Bruce et al. | ................ 711/103 |
| 6,040,997 A | 3/2000 | Estakhri | ................ 365/185.33 |
| 6,172,906 B1 | * 1/2001 | Estakhri et al. | ........ 365/185.11 |
| 6,519,186 B2 | * 2/2003 | Tamada et al. | ........ 365/185.33 |

OTHER PUBLICATIONS

"Advantages of large erase blocks" Dec. 1998, www.intel.com/design/flcomp/applnots/29763702.pdf.*

"Data Protection Method of SHARP Flash Memory" May 1999 (Revision 3), http://sharp–world.com/products/device/flash/pdf/AP–006–PT–E.pdf.*

PCMCIA PC Card Standard, 1992, p. 5–3.*

* cited by examiner

Primary Examiner—Mano Padmanabhan
Assistant Examiner—Paul Baker
(74) Attorney, Agent, or Firm—Sidley Austin Brown & Wood (57) ABSTRACT

A flash memory controller with a volatile program and data memory is disclosed. The controller loads microcode and data into the program and data memory from a flash memory array upon powerup of the controller. If an error occurs during the download or the microcode does not exist in the flash memory array, then the controller loads microcode and data into the program and data memory from the host computer. In some embodiments of the invention, an initial code is downloaded to the controller so that an evaluation of the configuration of the controller and the flash memory can be communicated to a host computer. The host computer then downloads for storage into the flash memory a tailored microcode and restarts the controller so that the tailored microcode is loaded from the flash memory and executed. In some embodiments, a protection circuit is provided to protect the microcode from accidentally being erased from the flash memory. Additionally, in some embodiments, an interleaved data structure is utilized to minimize wait times during read and write operations to the flash memory.

38 Claims, 5 Drawing Sheets

FLASH MEMORY CONTROLLER WITH UPDATEABLE MICROCODE

CROSS-REFERENCE TO CD-ROM APPENDIX

CD-ROM Appendix A, which is a part of the present disclosure, is a CD-ROM appendix consisting of 57 text files. CD-ROM Appendix A includes Verilog code (in a directory labeled VERILOG) for producing a controller chip as described below, initial code (in a directory labeled INITIAL) for controlling a microcontroller, and host computer code (in a directory labeled HDIAG) to create downloadable microcode and data as described below. The total number of compact disks including duplicates is two. Appendix B, which is also part of the present specification, contains a list of the files contained on the compact disk. The attached CD-ROM Appendix A is formatted for an IBM-PC operating a Windows operating system.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

These and other embodiments are further discussed below.

BACKGROUND

1. Field of the Invention

This invention relates to controllers and interfaces for flash memory controllers and, more particularly, to a flash memory controller with volatile program and data memory.

2. Discussion of Related Art

Flash memory is increasingly being utilized in small electronic devices as non-volatile data storage medium. Flash memory is also increasingly utilized as a replacement for conventional magnetic memory such as hard disks, floppy disks, and other non-volatile data storage media. Flash memory is a non-volatile semiconductor memory in which power consumption is small and data can be electronically rewritten. Further, flash memory stores data in the absence of power, is shock proof, and is light-weight and compact, thereby lending itself to many uses in the data storage area.

Flash memory stores data as charge on floating gates. Presence of charge on the floating gate represents one logic level while the absence of charge on the floating gate represents the opposite logic level. The state of a bit in flash memory, however, can not be simply changed. The bit must be erased and then rewritten. Because of the necessity of erasing bits in flash memory before a write to the flash memory can occur, data transfers to and from flash memory are handled differently than those in conventional magnetic memory which do not require an erase function before a new write can occur.

Flash memory utilized for data storage is usually arranged in blocks. Each block includes a plurality of addressable sectors, with each sector being within a physical block address PBA. In a conventional system, if the data or program stored within an address in a block is to be changed, the data in that source address is first read out of the flash memory and stored in a buffer latch. An erased block in the same flash device is identified as a destination block. Data, including the data to be retained from the source block, is then written into the destination block and the source block can be erased. In some systems, unchanged sectors can be transferred directly to the destination block without being buffered.

Conventionally, a computer system employs a dedicated controller for a flash memory drive. The host computer gives the controller read and write commands and the controller directly controls the reading from and writing to the flash memory itself. Furthermore, the controller performs memory management such as block erase, block reads, and block writes to the flash memory.

The controller, then, keeps track of blocks in use, blocks that have been erased, or blocks that have been damaged (or worn out). Therefore, the controller usually includes an address conversion table stored in memory separately from the flash memory in order to track data within the flash memory. Microcode executed by a microcontroller of the flash controller is typically stored in a non-volatile, non-erasable memory. The program memory, then, can not be easily modified. Furthermore, microcode appropriate for all configurations of the controller card needs to be stored on the controller card, leading to the need for a large amount of expensive storage capacity on the controller card.

Therefore, there is a need for memory controllers where the firmware for controlling the transfer of data between a host computer and a flash memory bank can be loaded into the memory controller from the host computer, increasing the versatility and decreasing the memory costs for the controller.

SUMMARY

In accordance with the present invention, a Flash Disk controller that can download microcode is disclosed. The Flash Disk Controller interfaces between a host computer and a flash memory bank. The Flash Disk controller according to the present invention includes volatile memory banks for storing microcode and data where microcode can be downloaded from a host computer.

On controller startup, the controller proceeds to shadow code and attempts to load the microcode from the flash memory bank itself. If the microcode is not present in the memory bank or there is an error in downloading the microcode from the flash memory (i.e. shadowing), then the flash memory controller expects download of microcode from the host computer. In some embodiments, the host computer can independently initiate download of microcode from the host computer in order to replace microcode already stored in the controller.

In some embodiments, the host computer can download an initial code into the program memory. In some embodiments, during download of the initial code the microprocessor of the controller is suspended. When the initial code is executed by the microprocessor of the controller (i.e., by releasing the microprocessor), diagnostics are performed on the controller and the flash memory coupled to the controller to determine, for example, the flash memory configurations, defects in the flash memory, and other information. In some embodiments, the initial code executed by the microprocessor operates in response to commands from the host computer. The information obtained in the diagnostics routine is uploaded to the host computer so that the host computer can construct microcode tailored for that particular controller with that flash memory configuration. The newly constructed microcode is downloaded through the controller and stored in the flash memory. During the download process, the new microcode can be treated as regular data to be written into flash memory. In this fashion, the new microcode tailored by the host computer for the particular configuration can be loaded directly into the flash memory and the controller card reset to execute the new microcode. The controller card therefore requires much less memory space to hold the tailored microcode than would be needed if the microcode for all configurations were required to be stored.

In some embodiments, on startup, the controller reads the microcode from the flash memory and loads it into volatile memory. The controller, then, includes a microprocessor that executes the microcode from the volatile memory. In some embodiments, an error check can be performed on the microcode as it is loaded from flash memory into volatile memory. If an error is detected, the controller can switch to download mode in order to load new microcode into the volatile memory from the host computer. In some embodiments of the controller, the microprocessor is held in a hold mode until microcode is available in the volatile memory. In some embodiments, when the controller switches to download mode all commands from the host processor but the download command are either ignored or responded to with an error code. When the download is completed, the microprocessor is released to execute the code downloaded into volatile memory.

In some embodiments, the area of flash memory utilized for storage of the microcode is protected against accidental erasure. The protection can be performed by comparing a password stored in a password register with a stored password before the area of flash memory is written. If the passwords do not match, the controller can issue an error message. Therefore, in order to download the new microcode into the appropriate area of the flash, the appropriate password is loaded into the password register. Then the new microcode can be loaded into the appropriate area of the flash memory.

In some embodiments, the controller executes an interleaved storage system. The flash memory includes several flash memory chips which, in some embodiments, can be separated into multiple banks of flash memory chips. In some embodiments, data is written alternatively into sectors of different chips. In that fashion, during a read operation during the time that a first flash memory chip is loading data from a requested sector into a buffer of the first flash memory chip, the controller is asking a second flash memory chip for the sector corresponding to the next data in the requested data. Therefore, the read time can be shortened.

In some embodiments, the controller is programmed once during its operational lifetime. It can, for example, be programmed at the factory before shipping. In other embodiments, the controller can be reprogrammed multiple times during its operational lifetime.

The major advantages of downloadable microcode include the requirement of less memory in the controller and the versatility of downloading updated versions of the software. The lowered memory requirements lead to lowered cost of the controller and the ability to reload microcode leads to higher versatility of the controller. These and other embodiments are further discussed below with respect to the following figures.

BRIEF DESCRIPTION OF THE FIGURES

FIG. 2b shows a block diagram of a download algorithm of the start-up algorithm of FIG. 2a.

In the figures, elements having the same identifier have the same function.

DETAILED DESCRIPTION

Figure 1:
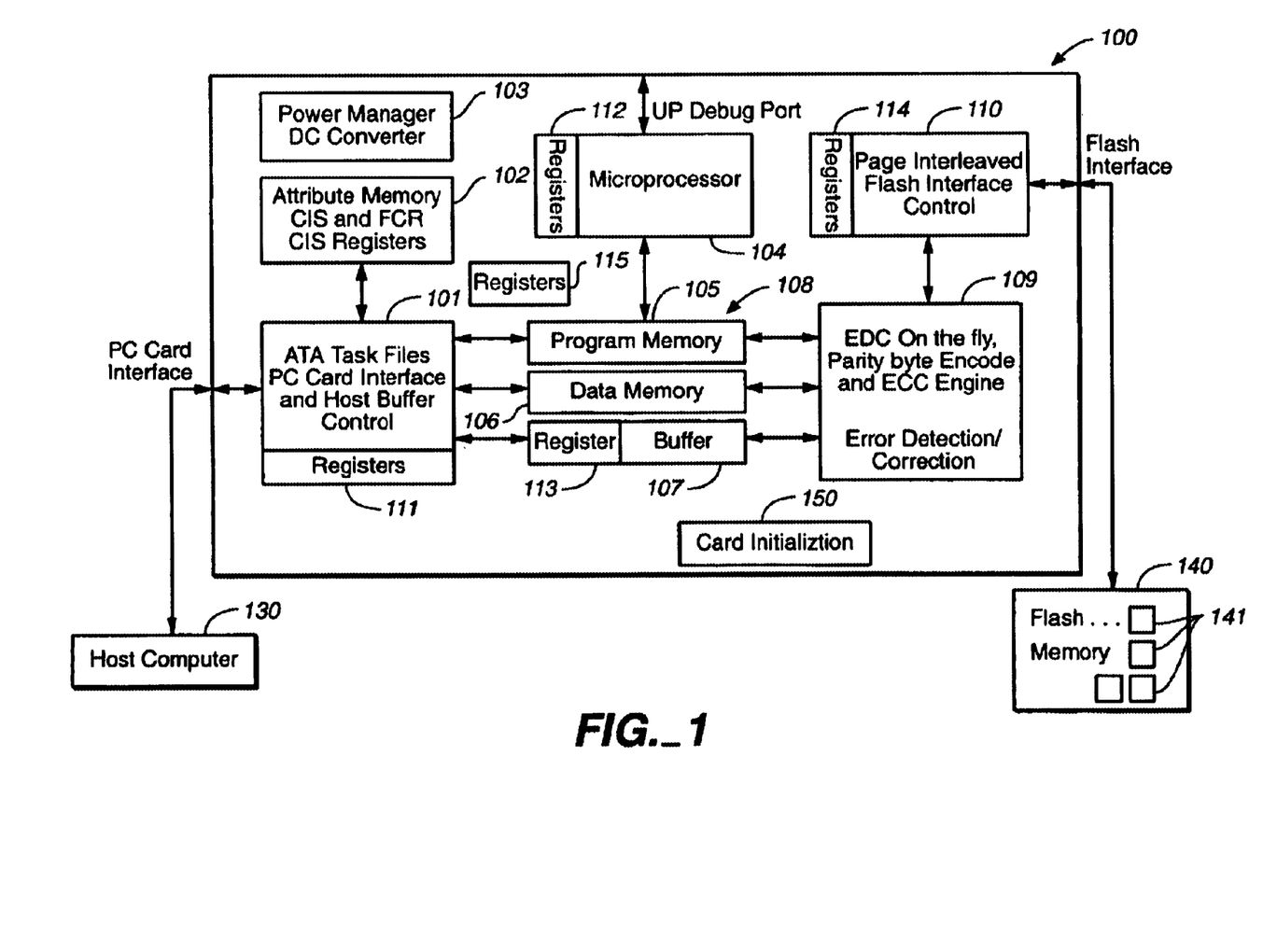
FIG. 1 shows a block diagram of an embodiment of a flash memory controller according to the present invention.

FIG. 1 shows a block diagram of an embodiment of a flash memory controller 100 according to the present invention. Controller 100 includes a host interface 101, a volatile memory 108, a microprocessor 104, an error correction block 109, a flash interface 10, and a card initialization block 150. Flash interface 110 is coupled to flash memory bank 140. Host interface 101 is coupled to host computer 130.

In general, flash memory bank 140 is divided into blocks 141. Whole ones of blocks 141 are erased at a time. After erasing a block 141, individual sections in the block can then be written. Since each section of a block 141 are linked so that whole blocks are erased at once, out of date information can not be erased unless all information in block 141 is erased. Furthermore, data can not be rewritten into each of blocks 141 until the entire block has been erased. As a result, valid data may be moved into different ones of blocks 141 of flash memory 140 periodically so that invalid data can be overwritten. Therefore, controller 100 controls the reading of data from flash memory 140 and the erasure and rewriting of data into blocks 141 of flash memory 140.

Figure 4A:
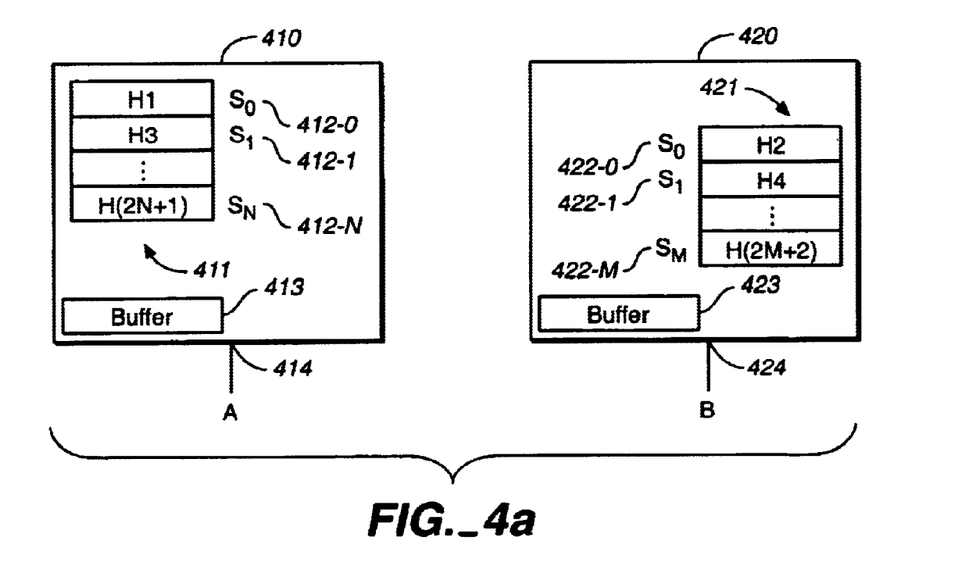
FIGS. 4a, 4b, and 4c show a block diagram illustrating interleaved reading and writing to flash memory according to the present invention.

FIG. 4a shows an example of flash memory chips 410 and 420. Chip 410 includes block 411 with sectors 412-0 through 412-N. Chip 420 includes block 421 having sectors 422-0 through 422-M. If, for example, sector 412-1 is to be rewritten, and block 421 has been erased, then sectors 412-0 and 412-2 through 412-N can be transferred to block 421. A new sector 412-1 can then be written into block 421 and block 411 can be erased.

In most embodiments, at least a portion of the flash memory management system of controller 100 is encoded in microcode that is executed by microcontroller 104. Some of the flash memory management system of controller 100 is embedded in the firmware operation of, for example, flash interface 110 and error correction block 109.

Data read from flash memory 140 through interface 110 is received by error correction block 109. Error correction block 109 checks errors on the fly as data is received from flash memory 140 and attempts to correct error problems. The functions of error correction block 109 are well known in the art. In some error correction schemes, for example, 6 bytes of redundancy can be appended to a 512 byte block, which can detect up to 31 bits of error and, once the errors are found, can proceed with error correction routines. Data can then be transferred from error correction block 109 to buffer region 107 of memory block 108.

Memory block 108 also includes program memory 105, which holds microcode that can be executed by microcontroller 104 to control the transfer between host computer 130 and flash memory 140, and data memory 106, which includes, for example, reference tables for monitoring bad data blocks in flash memory 140. Since flash memory tends to decay with time, in most embodiments flash memory 140 is monitored by controller 100 and the reference tables of data memory 106 are often updated. In some embodiments, memory 105 can be 8 KB of SRAM, memory 106 can be 2 KB of SRAM for storing defect mapping tables, and memory 107 can be 4 KB of data as a data buffer. Other examples can include any combination of sizes for memory 105, 106 and 107. The microcode and the defect mapping table can be loaded into program memory 105 and defect memory 106, respectively, from flash memory 140 itself or, if it is not present in flash memory 140 or corrupted in flash memory 140, may be downloaded from host computer 130.

Interface 101 interfaces between flash controller 100 and host computer 130. Interface 101 receives control signals from host computer, transmits status and error codes to host computer 130, and transfers data between controller 100 and host computer 130. Attribute memory 102 stores registers for controlling the operation of controller 100. Attribute memory 102, for example, includes information regarding the interface types and serial numbers for the controller. The card information structure (CIS) can include, for example, the following registers: CISTPL_DEVICE, which is a function specific memory address range; CISTPL_DEVICE_OC, which is another function specific memory address range; CISTPL_JEDEC_C, which is PC Card ATA register; CISTPL_MANFID, which is the card manufacture code; CISTPL_VERS_1, which is the manufacturer version number for controller 100; CISTPL_FUNCID, which identifies the function of controller 100 (for example fixed disk); CISTPL_FUNCE, which identifies interface 101 (for example PC Card ATA, device types, serial numbers, low power modes); CISTPL_CONFIG, identifying the locations of the function configuration registers; CISTPL_CFTABLE_ENTRY, which includes information regarding default systems, memory mapping, and power management requirements; and CISTPL_NOLINK registers. The information in these registers can be downloaded into flash memory 140 and shadowed in the SRAM of attribute memory 102. Other registers are permanently fixed and stored in non-volatile memory of attribute memory 102.

Host interface registers 111 can include registers for interfacing with host computer 130. Host interface registers 111 can include, for example, the following registers:

AFEAT, the features register which is used for the set features command;

AERR (ATA Error Register—write), which contains additional information about the source of an error when an error is indicted in a status register (e.g., CTRR);

ASECC (ATA Sector Count Register—read/write), which contains the number of sectors of data requested to be transferred on a read or write operation between host computer 130 and flash memory 140 and continues to store the number of sectors needed to be transferred in order to fulfill the request;

SECNUM/LBA0 which, depending on a flag of the MHEAD/MLBA3 register, is the ATA Sector Number Register (read/write), indicating the starting sector number in CHS mode, or the ATA LBA0 Register (read/write), indicating the starting LBA0 address in LBA addressing mode;

CYLL/LBA1 which, depending on a flag of the MHEAD/MLBA3 register, is the ATA LBA1 Register, indicating the starting LBA1 address in LBA mode, or the ATA Cylinder Low Register, indicating the low order 8 bits of the starting cylinder address in CHS mode;

CYLH/LBA2 which, depending on a flag of the MHEAD/MLBA3 register, is the ATA LBA2 Register (read/write), indicating the starting LBA2 address in LBA mode, or the ATA Cylinder High Register, indicating the higher order 8 bits of the starting cylinder address in CHS mode;

MHEAD/MLB3, the address mode selection register, which indicates whether Cylinder/Head/Sector (CHS) or Logical Block Address (LBA) mode of addressing has been selected, further, includes an ATA Head Register if CHS mode is selected and an ATA LBA3 Register of LBA mode is selected;

ACMD, the ATA Command Register, which contains the command operational code set written by host computer 130 and read by controller 100;

FSR, the Future Status Register, contains statuses (e.g., device drive ready DRDY, device fault DF, device seek complete DSC, corrected data CORR, and error ERR conditions) that controller 100 must maintain, which in some embodiments can be copied into the status register CTRR;

ADCV, the ATA Device Control Register, which contains information for ATA Soft Reset function and Host Interrupt Control setable by host 130;

CTRR, the ATA Status Register, which can be a copy of the FSR register and can include a bus busy flag (BBUSY), a drive ready flag (DRDY), a device fault flag (DF), a device seek complete flag (DSC), a data request flag (DRQ), a corrected data flag (CORR), and an error flag (ERR);

HISV, the Host Interface Signal Value Register, which stores the ATA interface flags set through monitoring the interface, including True IDE mode (TIDE), master/slave Card Drive Configuration (CDRV), DASOB Signal of the ATA Interface (DASPB), the PDIAGB Signal of the ATA Interface (PDIAG), and card busy (CBUSY);

HIC, the Host Interface Control Register, which includes a SetCdBsy (Set PC Card Busy), a SetDASPB (Set DASPB Signal of ATA Interface 101), SetPDIAGB (Set PDIAGB Signal of ATA interface 101), SetHINT (Set INTRQ Signal of ATA Interface 101), ClrCdBsy (Clear PC Card Busy), ClrDASPB (Clar DASPB Signal of ATA Interface 101), ClrPDIAGB (Clear PDIAGB signal of ATA Interface 101), ClrHINT (Clear INTRQ Signal of ATA Interface 101); and ICC, the Interface Configuration Control Register, which includes a MDRV (Master Drive Selection) flag, a SShadow (Slave Shadow Feature Enable) and a DisShadR (Disable Shadow Auto Response) flags.

Further, control controller 100 can include microprocessor interface registers 112. Microprocessor interface registers 112 include registers for controlling microprocessor 104. Microprocessor interface registers 112 can include, for example, HIS/HIC, the Host Interrupt Status Register in a read operation or the Host Interrupt Clear Register in a write operation, which informs the firmware of control controller 100 of various hardware interruptions, including a TxfrDone (Total Host Read Transfer Done interrupt, a CsfrDone (Current Host Transfer Done) interrupt, a SR (Software Reset) interrupt, a ASrst (ATA Software Reset) interrupt, a ScmdRcv (Shadow command Receive) which is set when the host writes a shadow reset command into the ATA Command Register, a SectDone (Host Transfer one Sector Done) interrupt, and HCmd (Host Command) which indicates when host 130 has written a commend into the ATA command register;

FIS/FIC, the Flash Interrupt Status Regsiter in a read operation or the Flash Interrupt Clear Register in a write operation, which shows the flash memory related interrupts;

HIM, the Host Interrupt Mask Register, which is used to control host related interrupts, including TxfrDoneE (Total Host Read Transfer Done Enabled), CsfrDoneE (Current Host Transfer Done Enabled), a SRE (Card Software Reset Interrupt Enabled), a AsrstE (ATA Software Reset Interrupt Enabled), SectDoneE (Host Transfer One Sector Done Interrupt Enabled), and HcmdE (Host Command Interrupt Enabled) signals; and FIM, the Flash Interrupt Mask Register, which is used to control Flash Memory interrupts.

Controller 100 may also include buffer manager registers 113 for controlling and tracking data in and out of buffer memory 107. Buffer manager registers 113, for example, can include the following registers:

VCC, the valid cache count register, which stores the valid cache count for host auto-read or flash memory auto-write operations;

CSAR, the Valid Cache Count Control Register, which is utilized to increment or decrement the valid cache count register;

CSPNR, the cache bottom page number registers, which specifies the bottom cache page number;

CTBCL, the Current Transfer Byte Count Low Register;

CTBCH, the Current Transfer Byte Count High Register;

HTLR, the Host Transfer Length Register;

HTPR, the Host Transfer Pointer Register;

HTTC, the Host Total Transfer Count Register, which stores the total number of pages to be transferred to host computer 130;

HOC, the Host Operation Command Register, which can include a SAH (Start Automatic Host Transfer) flag, a BBC (Bus Busy Control) flag, an IRQ (Interrupt Request), a DRQ (Data Request), and a HDTD (Host Data Transfer Direction, which specifies the direction of data transfer;

HTS, the Host Transfer Status Register, which indicates whether controller 100 is transferring data or not; and HGC, the Host General Control Register, including an SAbort (Start to Abort Host Related Operation), SFRST (Start Firmware Reset), and SARAC (Stop Auto-Read After Current Transfer) flags.

Further, flash memory interface 110 is controlled through flash memory registers 114. In some embodiments, flash memory 140 is addressed using CBP (chip number, erase block, page number) addressing. Flash memory registers 114 can include the following registers:

CCR, the Chip Configuration Register, including C256 which indicates the size of the flash memory chip being addressed, and BSP, which indicates the size of the erase block;

FCNA, the Flash Chip Number A Register, which selects the flash memory chip for an A-interface coupled to interface 110;

EBAL, the Erase Block Address A Low Registers, which indicates the erase block address for the A-interface flash chip indicated in the FCNA register;

EBAH, the Erase Block Address A High Register, which indicates the erase block address for the A-interface flash chip indicated by the FCNA register;

FCNB, the Flash Chip Number B Register, which indicates the selected flash memory chip for a B-interface of interface 110;

EBBL, the Erase Block Address B Low Register, which indicates the erase block address for the B-interface flash chip indicated by the FCNB register;

EBBH, the Erase Block Address B High Register, which indicates the high order erase block address for the B-interface flash chip indicated by the FCNB register;

PNG, the Page Number Address, which specifies the page number for the flash memory chip and can include a flag indicating which interface, A or B, is processed next;

FTTC, the Flash Total Transfer Count Register, which indicates the total page count left to be transferred between buffer memory 107 and flash memory 140;

FBP, the Flash Buffer Pointer Register, which controls access to the flash buffer between interface 110 and flash memory 140;

FMC, the Flash Memory Command Register, which controls access to flash memory 140, including PRD (Page Read) which indicates a page read from flash memory 140, MPW (multiple page write) which indicates a multiple page write operation, SPW (Single Page Write) which indicates one page of data written to flash memory 140, CFF (check FF pattern) which indicates performance of a flash memory check, RDST (read status) which reads the flash memory status of the selected chip, BlkEra (Block Erase) which is a command to erase the selected block, RstBuf (Reset Flash Memory Buffer) which resets a read operation by resetting the flash memory buffer, and RID (read chip ID) which reads to firmware the chip ID of the selected flash memory chip;

FTSR, the Flash Transfer Status Register, which indicates whether the flash memory chip (A interface and B interface) are busy, set area A, halts the flash memory operation, and aborts flash memory operation;

CAID0R, the Chip A ID Register;

FROSAR, the Flash Read Operation Status A Register, including an Inv (Invalid Status) flag, an AFF (all data are "FF") flag, CECC (corrected ECC) indicates an error correction, ECCER (ECC Error) indicating that error correction 109 found an uncorrectable error, and EDCERR (EDC Error) indicating that an EDC error has been located;

FOSAR, the Flash Operation Status A Register, which indicates if an operation has failed;

CAID1R, the Chip A ID1 Register, indicating the ID of the flash memory chip indicated for interface A;

WASA, the Write Additional Status A Register, which indicates that last write operation following an interrupt command;

CBID0R, the Chip B ID0 Register, which indicates the chip ID for the interface B chip;

FROSBR, the Flash Read Operation Status B Register, which indicates the status of the flash memory chip on interface B, including Inv (Invalid Status), AFF (All data are "FF"), CECC (Corrected ECC) which indicates corrected ECC data from error correction 109, ECCER (ECC Error) which indicates an uncorrected ECC data, EDCERR (EDC Error) which indicates that an EDC Error has been detected by error correction 109;

FOSBR, the Flash Operation Status Register, indicates an operation error;

CBID1R, the Chip ID1 Register, the flash chip ID register;

WASB, the Write Additional Status B Register, indicating the last write command type after a write interrupt;

FGCR, the Flash General Control Register, including AFOE (Automation Flash Operation Disabled), PIKE (Program 1K Command Enabled), PIE (Page Interleave Enable), EDCE (EDC Engine Enabled), and ECCE (ECC Engine Enable).

EDPR, the ECC Data Port Register, which stores the ECC data;

EDIR, the ECC Data Index Register;

FDCSA, the Flash Direct Control Signal A Register, including SEA indicating an SE signal, WPA indicating a WP signal, CSEA (Chip Selection Enabled for chip A) which enables the flash memory chip on interface A, and ALEA for ALE signal for the flash memory chip on interface A;

FDSA, the Flash Direct Status A register which indicates whether the flash memory chip indicated for interface A is active or not;

FDDA, the Flash Direct Data A Register, which is coupled to the flash memory data bus;

FDCSB, the Flash Direct Control Signal B Register, SEB indicates SE for the flash memory chip on interface B, WPB, CSEB (chip select Enable for B), CLEB, and ALEB;

FDSB, the Flash Direct Status B Register, which indicates whether flash memory chip on interface B is active or not;

FDDB, the Flash Direct Data B Register, which is coupled to the interface B data bus; and GD#, which is several General Data Register.

Controller 100 may further include several registers, system control registers 115, which can be utilized by host computer 130 to configure controller 100. System control registers 115, for example, can include the following registers:

HCOR, the Host Configuration Option Register, which allows host computer 130 to configure interface 101, address decoding, and interrupts as well as to issue a soft reset to controller 100;

CCSR, the Card Configuration and Status Register, which contains information regarding the condition of controller 100, which may include a changed flag indicating that one or both of the CRdy or CWProt bits are set, a SigChg flag which allows host 130 to enable or disable a state-change signal from the status register, a lois8 flag which allows host 130 to configure 100 for 8 bit I/O mode, a Pwrdwn flag which allows host 130 to request that controller 100 enter a power saving state, and an Int flag for requesting an interrupt;

HPRR, the Host Pin Replacement Register, which can include a Crdy/-Bsy flag, which indicates when the Card Ready state of controller 100 has changed, CWProt which can be set when read-write protection changes state, a Rdy/Bsy flag which indicates whether the internal state of controller 100 is ready or busy, MRdy-bsy which asks as a mask for writing the Crdy/-Bsy flag, a Wport flag which indicates a write protect state, and a MWPort which is a wask for the Wport flag;

SACR, the Socket and Copy Register, which contains additional configuration information including Drive# indicating the drive number of controller 100;

CCNP, the CIS Pointer Register, which provides a pointer to CIS data including a CIS Page Pointer Register, the CIS Page Number, and the Half Page Address;

VCR, which indicates the Chip Version Number for controller 100;

PCR, the Power Control Register, which controls power manager 103 and includes a CLKSTPOP flag that stops operation of the PLL clock, a STDBY flag which switches power supply 103 to standby mode, an APSD flag which is an Auto Power Saving Disable flag, and a SLPS flag which is a sleep start flag;

CCR, the Miscellaneous Control Register, which can include a LongD flag allowing the byte count to be 516 when transferring data with host 130, a MPObv flag which allows observation of microcontroller 104, a MRE flag which allows remapping of memory 108 to allow for a larger sized program memory 105 at the expense of buffer memory 107, and a CLKS flag which allows a clock signal from an external source;

IMC, the Idle Mode Control Register, which can be utilized to induce controller 100 to enter idle mode; and various data registers.

Power manager 103 supplies the power requirements, including voltages and clock signals, required for operation of controller 100. As discussed above, aspects of power manager 103 are controlled by various control registers. The voltages and clock signals, in some embodiments, can be set by values stored in CIS registers of attribute memory 102 or system control registers 115.

In some embodiments, controller 100 is compatible with PCMCIA Specification release 6.1, however other embodiments may be compatible with other specifications. Some embodiments, as shown in FIG. 1, can support PC Card ATA interface protocols, may include an automatic power saving standby and power down mode, can be produced with low-power CMOS technology with a 3.3V power supply, and can include on-the-fly error detection (EDC) and error correction code (ECC) capability (in error correction 109). Flash memory 140 may include any flash memory system, including 32 Mb, 64 Mb, 128 Mb, 256 Mb, and 512 Mb NAND type flash interface. In some embodiments, controller 100 can be included on a single integrated circuit chip. Embodiments of the invention can include any system clock speed.

In some embodiments, host computer 130 controls embedded Attribute Memory 102 for CIS (card information structure) and Configuration Control registers; controls dual data registers; controls error and features register supporting 8, 16, or other size bit data transfers; supports high transfers rates (for example 16.6 MB rates); supports memory mapping, IO mapping and true IDE mode; supports automatic protocol control on block transfers for ATA read or write commands; and supports multiple read and write.

In some embodiments, flash memory 140 can be any number of pieces (for example from 1 to 16) of any size or type of flash memory (for example 32 Mb, 64 Mb, 128 Mb, 256 Mb, 512 Mb or 2 Gb NAND type Flash). In some embodiments, interface 110 can support any total size of flash memory 140 (for example, between 4 MB to 512 MB). In some embodiments, error correction 109 can perform ECC functions to correct 2 random bits for each 512 bytes. Additionally, on-the-fly EDC can detect 4 random bits up to 31 bits in 512 bytes. In some embodiments, interface 110 can perform two-way interleaved read/write capability to reduce Flash access latency and supports program, erase, sector read and status report functions. Further, interface 110 can support flash programming to reduce flash program time.

The microcode operated by microcontroller 104 can include algorithms for defect management to extend the life of flash memory 140 as well as algorithms for accessing flash memory 140 and transferring data between flash memory 140 through buffer memory 107 to host computer 130. Microcontroller 140, in some embodiments, can be an 80C32 microprocessor.

Several functions, including the functions of error correction 109, are controlled in hardware. In accordance with the present invention, hardware in interface 101, error correction 109, and interface 110 control downloading of microcode from host computer 130 and transfer of microcode from flash memory 140 into program memory 105 before microprocessor 104 is started. Further, the hardware functions in microcode shadowing during normal operation mode of controller 100.

Figure 2A:
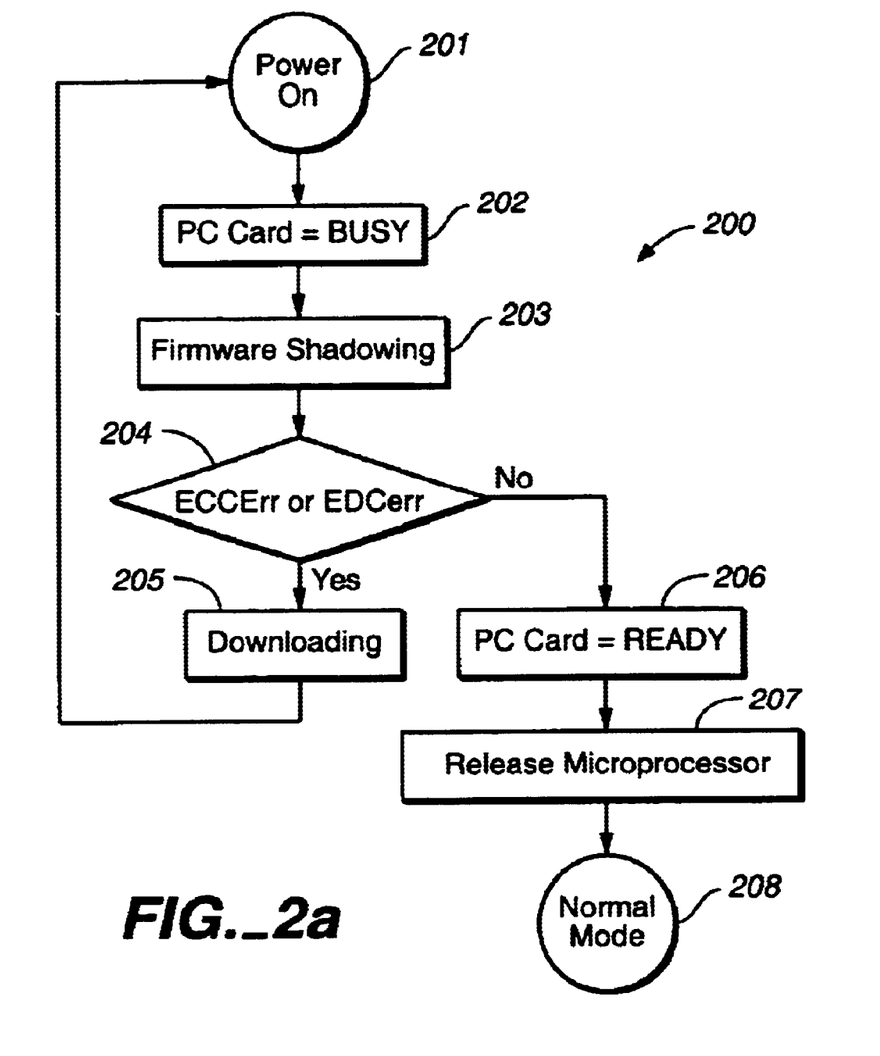
FIG. 2a shows a block diagram of the start-up algorithm for the flash memory controller according to the present invention.

In some embodiments, controller 100 operates in one of four modes: Power-on mode, shadowing mode, download mode or normal mode. FIG. 2a shows a power-on mode algorithm 200 according to the present invention. In block 201 of algorithm 200, chip 100 is powered up or reset. In block 202, firmware in chip 100 sets the PC-card busy flags so that no commands from host 130 are executed. In memory mapping mode, a PC card busy signal can be set. In non-memory mapping mode, a PC card busy signal can be set in the ATA Status Register.

In block 203, controller 100 initiates flash memory interface 110 by, in CPB format (chip, block, page addressing), setting an address for initial access into a starting address register. In some embodiments, the CPB address (registers FCNA, EBAL, EBAH, and PNG of flash memory interface 114) is set to [0,0,0] (chip 0, block 0, page 0). Additionally, a flash transfer count register (FTTC of flash memory register 114) can be set to an initial size (for example, 10 h), and a flash buffer pointer register (FBP of flash memory registers 114) can be initialized with an initial value (for example, 40 h). At this point, chip 100 can start buffering data from flash memory 140 into memory 108. In some embodiments, the flash buffer pointer register is set to buffer data into program memory 105. The flash transfer count register is initialized with the size of the microcode program stored in flash memory at the address stored in the CPB address register.

During the loading of data from flash memory 140 into memory 108 at the flash buffer pointer position indicated by the flash buffer pointer register, error checking is performed by error check 109. If any errors are found or are uncorrectable, then shadow mode is terminated and chip 100 switches to download mode. In FIG. 2a, if an error code is detected in block 204, then download block 205 is executed.

In some embodiments, after each page of microcode is transferred from flash memory 140 into memory 108, the flash transfer count register is decremented and the flash buffer pointer register is incremented by one. In some embodiments, once the flash transfer count register reaches a particular value, for example 2, then the flash buffer pointer register can be reset to memory 106 from memory 107 in order to load the data files corresponding to bad memory areas into the data memory portion 106 of memory 108. In some embodiments, the data memory area 104 can be loaded with data stored in attribute memory 102. Attribute memory, including data memory mappings, can be stored in flash memory 140.

In block 204, if no errors have been detected during transfer of microcode and data files into program memory 105 and data memory 106, respectively, then firmware algorithm 200 proceeds to block 206 where card 100 is switched to ready mode. In block 207, microprocessor 104 is released to begin execution of the microcode that has been loaded into program memory 105. After microprocessor 104 has been started to execute the microcode in program memory 105, then algorithm 200 switches to a normal mode of operation.

If, however, algorithm 200 detects an error in downloading the microcode from flash memory 140 or, as in the initial power up of chip 100, flash memory 140 does not contain the expected microcode, then algorithm 200 switches to download mode in block 205. The download mode of block 205 is utilized when the microcode is not in flash memory 140.

Figure 2B:
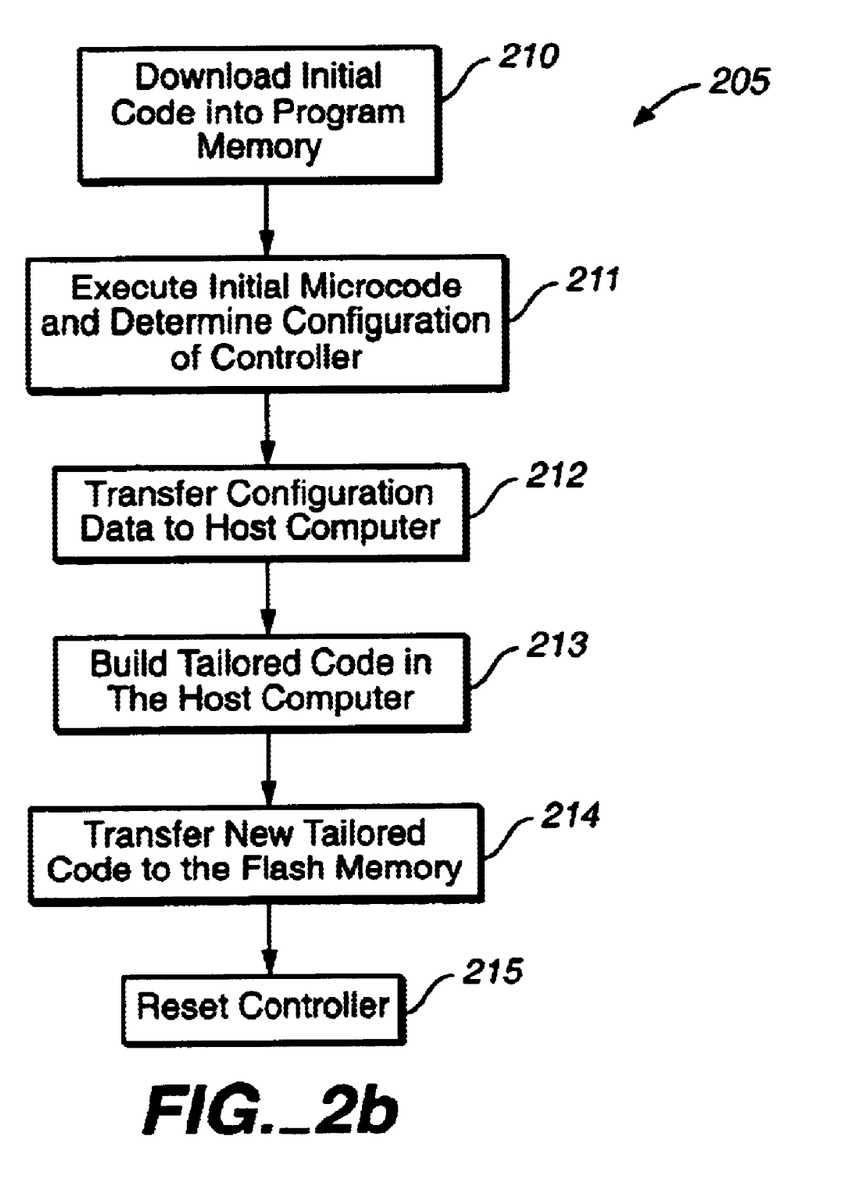

FIG. 2b shows an embodiment of download block 205 according to the present invention. In block 210, an initial code is downloaded into program memory 105. Controller 100 sets the PC Card ready and a signal is transmitted to host computer 130 indicating that the microcode is not stored in flash memory 140. For example, in some embodiments, in memory mapping mode, controller 100 will transmit to host computer 130 a signal indicating that no CIS data is available. The firmware in controller 100 then initializes controller 100 by setting an ATA task file register, for example a status register, to a value indicating a download status (for example, a 50 h). After receiving an ATA command from host 130, controller 100 will process the command automatically. If the command is other than a Firmware Download Command, then controller 100 sets the ATA Status Register such that the DRDY flag and the ERR flag are set, indicating an error and drive ready condition to host 130, and generates an interrupt to host 130 if host interrupts are enabled.

If the ATA command is a Firmware Download Command, then controller 100 initializes the Host Transfer Pointer Register (HTPR) of buffer manager registers 113 with the starting address of program memory 105, the Host Total Transfer Count Register (HTLR) of buffer manager registers 113 with the length of the microcode program, and initializes performance of an Auto-Write Operation to transfer data from host 130 to memory 108. After the initial microcode as been downloaded into program memory 105, the Host Transfer Pointer Register (HTPR) of buffer manager registers 113 is reset to the starting address of data area 106, Host Transfer Length Register HTLR is reset to the size of the CIS data, and the CIS data is downloaded from host 130 to data memory 106.

Once the initial microcode is loaded into program memory 105 and the CIS data is loaded into data memory 106, controller 100 releases microcontroller 104 to execute the microcode in block 211. In most embodiments, the initial code transferred into memory 108 determines the configuration of controller 100 and FLASH memory 140 and transmits that data back to host computer 130 in block 212. In block 213, host computer 130 tailors a microcode for the particular configuration (e.g., how much flash memory is in flash memory 140) of controller 100. In this fashion, the microcode for all configurations do not need to be resident in controller 100 or stored in flash memory 140, significantly reducing the on-board memory requirements of controller 100. Furthermore, memory mapping tables, file allocation tables, and CIS data is created by host computer 130.

In block 214, while still operating controller 100 with the initial microcode, the tailored microcode is downloaded into the microcode storage areas of FLASH memory 140 as regular data. Memory mapping tables, file allocation tables, and CIS data can be downloaded into FLASH memory 140 along with the tailored microcode. Once the tailored microcode and data is stored in FLASH memory 140, controller 100 can be reset in block 215. As shown in FIG. 2a, once controller 100 is reset, then algorithm 200 is restarted so that the busy flag for card 100 can be set and firmware shadowing 203 can be executed, thereby loading the tailored code into memory 108.

Figure 3:
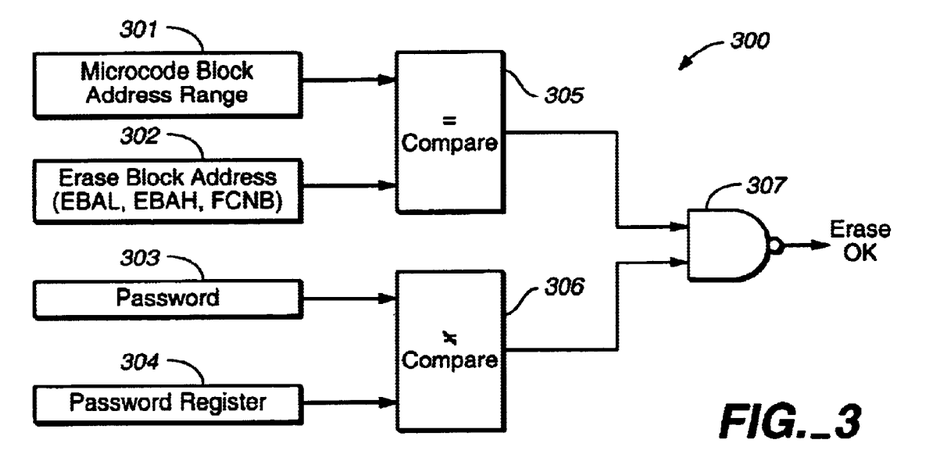
FIG. 3 shows a block diagram illustrating a protection system according to aspects of the present invention for insuring that the portion of the flash memory storing the microcode is not accidentally erased.

FIG. 3 shows a protection circuit 300 for protecting the microcode storage locations in FLASH memory 140 from being accidentally cleared and rewritten. When an erase block address is received by flash interface 110, the erase block address is stored in an erase block address register 302. A compare circuit 305 compares the address stored in the erase block address register 302 with a range of addresses stored in address range register 301. The range of addresses stored in address range register 301 corresponds to the range of addresses in FLASH memory 140 where the microcode and data are stored. The output signal from compare 305, which can be denoted TRUE if the erase address is within the range of addresses for storing the microcode and FALSE if the erase address is not within the range of addresses for storing the microcode, is input to NAND gate 307.

A password is stored in password register 303. If the microcode stored in FLASH memory 140 is to be erased in preparation for writing new microcode, then the password is loaded into password register 304. Compare 306 compares the contents of register 303 with that of register 304 and outputs a TRUE signal if those addresses are not equal and a FALSE signal if they are equal. The output signal from compare 306 is input to NAND gate 307. NAND gate 307 outputs a TRUE signal (indicating that it is allowable to erase the indicated block) if the erase address stored in register 302 is outside of the range indicated in register 301 or if the erase address stored in register 302 is within the range indicated in register 301 and the password stored in register 303 matches the password stored in register 304. Otherwise, NAND gate 307 outputs a FALSE signal, indicating an error has occurred and no erase operation should take place.

In normal operation, the password stored in register 304 is not the password stored in register 303 so that an error message is generated if a block containing microcode is attempted to be erased. Additionally, if the microcode stored in FLASH memory 140 is to be replaced, password register 304 can be loaded with the password stored in password 303, the new microcode can be written, and register 304 can be reloaded with anything but the password stored in register 303.

In some embodiments, an interleaved memory write algorithm is utilized. In NAND type FLASH memory, there is a limitation regarding the process time, especially erase time. The FLASH memory performance, especially in write operations, can be markedly increased by interleaving. In a read operation, the flash memory chip is sent the block address and sector address and the flash memory chip loads the flash memory cell data into an internal buffer. FIG. 4a shows a block diagram of two flash memory chips 410 and 420. Flash memory chips 410 and 420 include data blocks 411 and 421, respectively. Data blocks 411 and 421 each denote an arbitrary one of the data blocks in chips 410 and 420, respectively. Data block 411 is segregated into sectors 412-0 through 412-N and data block 421 is segregated into sectors 422-0 through 422-M, where N and M are integers denoting the number of sectors in a block in chip 410 and 420, respectively. Chip 410 includes buffer 413 and chip 420 includes buffer 423. Chip 410 receives read and write commands and data transfers through port 414 on line A. Chip 420 receives read and write commands and data transfers through port 424 on line B.

In general, a read to chip 410, for example, involves providing a read command along with a block address and sector address to port 414 on line A. Chip 410, then, loads the data from the indicated block and sector into buffer 413. Finally, the data is transferred from buffer 413 to controller 100 (FIG. 1). For example, if a read command indicates block 414 and sector 412-1, then the data in sector 412-1 is transferred to buffer 413 for transfer through port 414 to controller 100. In a typical FLASH memory cell, the loading time, i.e. the time required to transfer data from sector 412-1 to buffer 413, is about 10 microseconds. The time required to transfer data from buffer 413 to controller 100 is typically about 30 microseconds.

In a write operation to chip 410, for example to sector 412-1 of block 411, a write command specifying the block address and sector address (in this case the address of sector 412-1 of block 411) is presented to port 414 on line A immediately followed by data to be written into that sector. The data is stored in buffer 413 and may take about 30 microseconds to transfer from controller 100 to buffer 413. Chip 410, then, internally transfers the data from buffer 413 to sector 412-1 of block 411. In the write operation, block 411 must have been previously erased, which can take about 2 milliseconds in a typical FLASH memory chip, before the actual writing of data to sector 412-1 so that sector 412-1 of block 411 is completely blank. The internal write of data from buffer 413 to sector 412-1 can take about 200 microseconds, therefore a wait of about 200 microseconds must be made between transfers of data for subsequent writes.

The access speed of the memory system of FLASH memory 140 can be greatly increased if the data is interleaved between chips. In that case, both in a write or a read operation, while data is being transferred internally to one flash memory chip, a second flash memory chip is communicating with controller 100 and wait times can be minimized. In general, any level of interleave can be obtained. In one example, data can be alternately split between block 411 of chip 410 and block 421 of chip 420. In that case, a first sector H1 is written into sector 412-0 of block 411, a second sector H2 is written into sector 422-0 of block 421, and so forth until all of the data is stored between chips 410 and 420. In an embodiment with a three level interleave, three chips are involved so that first sector H1 is written into a $0^{th}$ sector of a block in a first chip; second sector H2 is written into a $0^{th}$ sector of a block in a second chip; third sector H3 is written into a $0^{th}$ sector of a block in a third chip; fourth sector H4 is written into a $1^{st}$ sector of the block in the first chip, and so forth in a round-robin fashion until the data is written between the three chips. In general, any number of chips can be utilized.

Figure 4B:
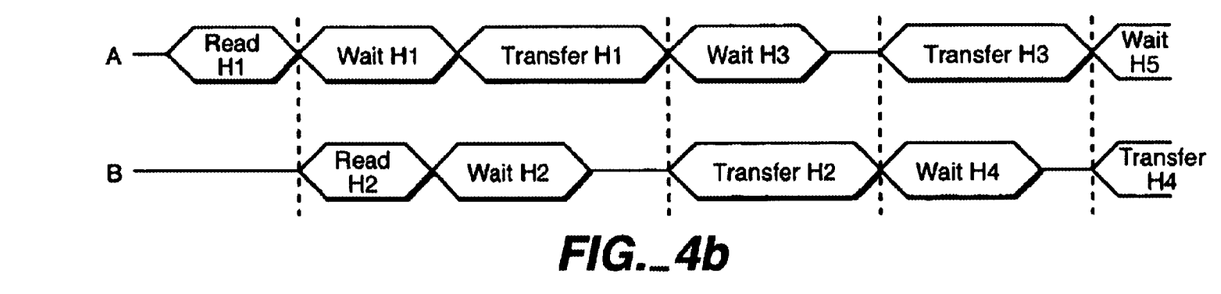

FIG. 4b shows an example of a read operation in a two-chip interleave system, as shown in FIG. 4a. Chip 410 receives a read command to H1 (including a block address and sector, for example block 411 and sector 412-0). While chip 410 is loading data from sector 412-0 to buffer 413, chip 420 is receiving a read address for the next sector of data H2 (block 421 and sector 422-0). When chip 410 is ready to download data, controller 100 receives data from buffer 413 and chip 410 proceeds to load buffer 413 with data H3 (buffer 411 and sector 412-1). At that time, data H2 is ready to transfer from buffer 423 to controller 100. Once data H2 is transferred, then chip 420 proceeds to transfer the next sector data H4. This process is repeated until all of the desired data is transferred sequentially from chips 410 and 420. Since, in many embodiments, there is only one error correction block 109, a single stream of data is received from FLASH memory 140. In general, parallel streams of data can be utilized. If the first read in a sequence is H4, for example, then a read command is presented to chip 420 first instead of chip 410 as illustrated.

Figure 4C:
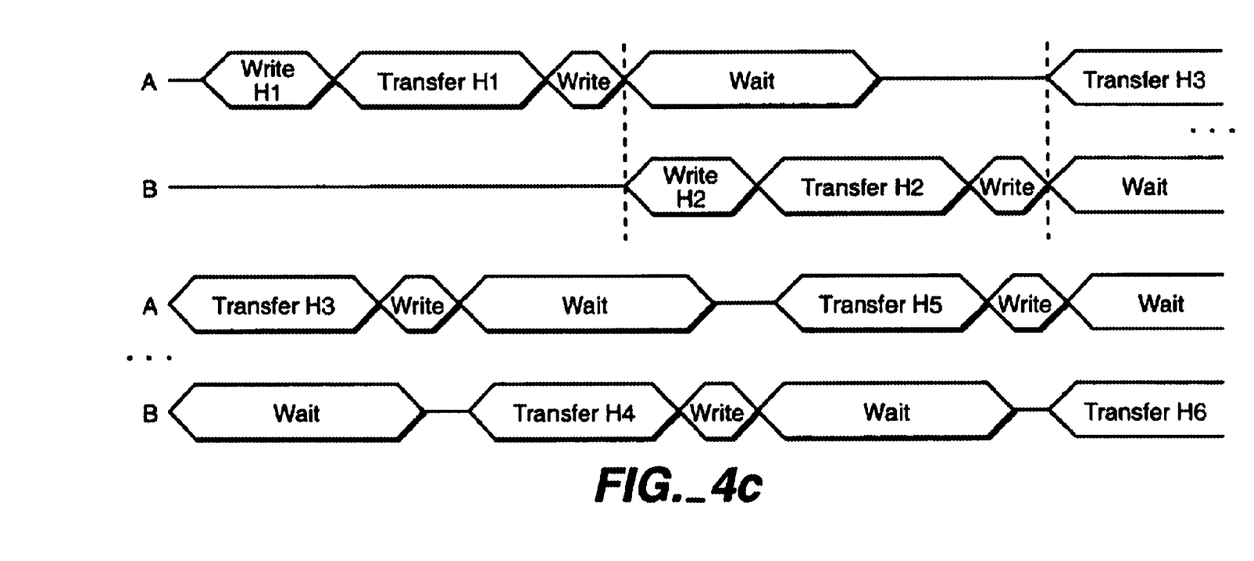

FIG. 4c illustrates a write operation for a sequence of data H1, H2, H3, H4, H5 . . . into FLASH memory 140. Chip 410 is presented with a write command and data H1, which is transferred into buffer 413. While data H1 is written into chip 410, for example at block 411 and sector 412-0 as indicated in the example, chip 420 is presented with a write command and data H2. When chip 410 is once again ready, data H3 is transferred to buffer 413 and chip 410 proceeds to write data H3 into the next sequential sector, in this case block 411 and sector 412-1. When chip 420 is once again ready, data H4 is transferred to buffer 423 and chip 420 proceeds to write data H4 into the next sequential sector, in this case block 421, sector 422-1. In that way, all of the data is written in a round-robin fashion between blocks 411 and 421 of chips 410 and 420, respectively.

Attached CD-ROM Appendix A, which is herein incorporated by reference in its entirety, includes Verilog code (in directory VERILOG) for producing an embodiment of controller 100 on an integrated circuit chip. CD-ROM Appendix A also includes an embodiment of software for operation of host computer 130 for creating microcode for downloading into controller 100 from host 130 (in directory HDIAG) and an embodiment of initial microcode for operating microprocessor 104 during the analysis and download process (in directory INITIAL), as was described above. A directory of text files included in CD-ROM Appendix A is included here as Appendix B, also hereby incorporated by reference in its entirety.

The above embodiments of the invention are exemplary only and are not intended to be limiting. One skilled in the art may recognize several variations of the invention which are intended to be within the scope of this disclosure. As such, the invention is limited only by the following claims.

Appendix B

Volume in drive D is 010507_1424
Volume Serial Number is 12C4-4769

Directory of D:\

| 05/07/01 | 02:24 p | <DIR> | . |
| 05/07/01 | 02:24 p | <DIR> | .. |
| 05/01/01 | 02:24 p | <DIR> | HDIAG |
| 05/07/01 | 02:24 p | <DIR> | INITIAL |
| 05/07/01 | 02:24 p | <DIR> | VERIL0G |

5 File(s)    0 bytes

Directory of D:\HDIAG

| 05/07/01 | 02:24 p | <DIR> | . |
| 05/07/01 | 02:24 p | <DIR> | .. |
| 02/29/00 | 03:29 p | 3,824 | ATA_C.TXT |
| 02/29/00 | 03:29 p | 4,904 | ATA_H.TXT |
| 05/03/01 | 09:59 a | 1,730 | BI2A_CPP.TXT |
| 02/23/00 | 04:01 p | 3,655 | DIAG_C.TXT |
| 09/24/99 | 04:05 a | 406 | DIAG_H.TXT |
| 09/30/99 | 04:25 a | 4,573 | DOSSYS_H.TXT |
| 02/28/00 | 05:34 p | 394 | EXTERN_H.TXT |
| 12/07/99 | 07:19 a | 33,085 | FF_C.TXT |
| 09/27/99 | 11:43 a | 948 | GENER_H.TXT |
| 02/28/00 | 03:28 p | 5,296 | GLOBAL_H.TXT |
| 09/24/99 | 04:05 a | 5,873 | IMLB_ASM.TXT |
| 09/28/99 | 10:41 a | 1,770 | IMLLIB_C.TXT |
| 09/28/99 | 10:41 a | 571 | MLLIB_H.TXT |
| 09/24/99 | 04:05 a | 2,838 | IMLP_ASM.TXT |

-continued

Volume in drive D is 010507_1424
Volume Serial Number is 12C4-4769

| 09/27/99 | 07:11 a | 11,758 | IML_H.TXT |
| 02/29/00 | 03:30 p | 50,348 | INIT_C.TXT |
| 02/28/00 | 04:07 p | 1,436 | INIT_H.TXT |
| 02/28/00 | 05:39 p | 2,429 | INTERR_C.TXT |
| 02/29/00 | 02:55 p | 6,034 | MAIN_C.TXT |
| 09/24/99 | 04:05 a | 476 | MAIN_H.TXT |
| 05/03/01 | 11:20 a | 5,474 | PARM_H.TXT |
| 02/07/00 | 09:21 p | 3,003 | PROTOC_H.TXT |
| 02/14/00 | 03:25 p | 2,452 | README.TXT |
| 02/28/00 | 05:37 p | 11,790 | SYSIN_C.TXT |
| 02/28/00 | 04:33 p | 662 | SYSIN_H.TXT |

27 File(s)    165,729 bytes

Directory of D:\INITIAL

| 05/07/01 | 02:24 p | <DIR> | . |
| 05/07/01 | 02:24 p | <DIR> | .. |
| 05/16/00 | 09:29 a | 6,182 | FLASH_C.TXT |
| 05/16/00 | 09:30 a | 5,356 | GEN_H.TXT |
| 05/16/00 | 09:30 a | 12,566 | IML_H.TXT |
| 05/16/00 | 09:30 a | 31 | INIT_BAT.TXT |
| 05/16/00 | 09:30 a | 7,525 | INIT_C.TXT |
| 05/16/00 | 09:30 a | 139 | INIT_INP.TXT |
| 05/16/00 | 09:30 a | 700 | INIT_MAK.TXT |
| 05/16/00 | 09:30 a | 116 | MSSC_SCC.TXT |
| 05/16/00 | 09:30 a | 2,881 | PROTO_H.TXT |
| 05/16/00 | 09:30 a | 2,116 | RE52_EQU.TXT |
| 05/16/00 | 09:30 a | 2,088 | RE52_H.TXT |
| 05/16/00 | 09:30 a | 4,634 | STAR_ASM.TXT |
| 05/16/00 | 09:30 a | 27,778 | TESTS_C.TXT |

15 File(s)    72,112 bytes

Directory of D:\VERILOG

| 05/07/01 | 02:24 p | <DIR> | . |
| 05/07/01 | 02:24 p | <DIR> | .. |
| 05/01/01 | 12:07 p | 1,318 | CLKBUF_V.TXT |
| 05/01/01 | 06:11 p | 16,320 | CORE_V.TXT |
| 05/01/01 | 06:11 p | 62,115 | ECC48D_V.TXT |
| 05/01/01 | 06:00 p | 13,731 | ECC48S_V.TXT |
| 05/01/01 | 06:01 p | 2,582 | ECC48T_V.TXT |
| 05/01/01 | 12:27 p | 13,735 | ECCTES_V.TXT |
| 05/01/01 | 06:02 p | 10,825 | EFMINT_V.TXT |
| 05/01/01 | 06:02 p | 21,511 | FMREG_V.TXT |
| 05/01/01 | 06:03 p | 860 | FUNCT1_V.TXT |
| 05/01/01 | 06:03 p | 860 | FUNCT2_V.TXT |
| 05/01/01 | 06:04 p | 23,109 | HBTCTL_V.TXT |
| 05/01/01 | 06:05 p | 4,427 | INITIA_V.TXT |
| 05/01/01 | 06:05 p | 5,504 | INITMO_V.TXT |
| 05/01/01 | 06:06 p | 12,969 | MPI_V.TXT |
| 05/01/01 | 06:06 p | 11,190 | OFMINT_V.TXT |
| 05/01/01 | 06:06 p | 30,504 | PGINTR_V.TXT |
| 05/01/01 | 07:51 p | 15,509 | RAMC_V.TXT |
| 05/01/01 | 06:08 p | 19,775 | TESCTL_V.TXT |
| 05/01/01 | 06:10 p | 46,967 | TIDE_V.TXT |

21 File(s)    313,811 bytes
Total Files Listed:
68 File(s)    551,652 bytes (57 Files not including
              0 bytes <DIR>s)
              free

We claim:

1. A flash memory controller, comprising:
a host interface that can couple with a host computer;
a flash memory interface that can couple with a flash memory;
a volatile memory area for storing microcode and data; and
a microcontroller coupled to execute microcode stored in the volatile memory area; and
wherein the microcode can be loaded into the volatile memory area through the flash memory interface, and wherein tailored microcode and data can be loaded into the flash memory from the host computer if the microcode and data are not correctly loaded into the volatile memory area from the flash memory.

2. The controller of claim 1, wherein new microcode is loaded into the flash memory from the host computer if a portion of the microcode is blank in the flash memory.

3. The controller of claim 1, wherein data is loaded into the volatile memory area through the flash memory interface and wherein data can be loaded into the flash memory from the host computer before the data is loaded into the volatile memory area from the flash memory.

4. The controller of claim 3, wherein data and microcode are both loaded into the flash memory from the flash controller together.

5. The controller of claim 4, wherein new microcode and data are loaded into the flash memory from the host computer if a portion of either the microcode or the data is blank in the flash memory.

6. The controller of claim 3, wherein the data includes card information structure (CIS) data.

7. The controller of claim 3, wherein the data includes a memory mapping table.

8. The controller of claim 7, wherein the memory mapping table includes a mapping of logical addresses to physical addresses that maps out bad blocks in the flash memory.

9. The controller of claim 3, wherein the data includes a file allocation table.

10. The controller of claim 1, further including an error correction circuit for detecting errors in microcode loaded from the flash memory.

11. The controller of claim 10, wherein new microcode is loaded into the flash memory if the error correction circuit detects an error in the microcode loaded from the flash memory.

12. The controller of claim 3, further including an error correction circuit for detecting errors in microcode and data loaded from the flash memory.

13. The controller of claim 12, wherein new microcode and data are loaded into the flash memory if the error correction circuit detects an error in the microcode loaded from the flash memory.

14. The controller of claim 1, further including a protection circuit that prevents accidental erasure of a portion of flash memory that stores the microcode.

15. The controller of claim 14, wherein the protection circuit compares an erase address with a range of addresses where the microcode is stored and outputs an error message if a password loaded into a password register does not match a stored password.

16. The controller of claim 1, further including a memory management system having an interleaved data structure.

17. The controller of claim 16, wherein the interleaved data structure is a two-chip interleave where sectors of data are alternately stored between a first block in a first chip and a second block in a second chip.

18. The controller of claim 16, wherein the interleaved data structure is multi-chip interleave where data is stored in a round-robin fashion between a block in each of a plurality of chips.

19. A method of powering up a flash memory controller, comprising:

indicating a PC Card busy;

executing a firmware shadowing algorithm to load microcode from a flash memory bank into a volatile memory area;

indicating a state of the loading from the flash memory bank, wherein the state indicates either a successful loading or a not successful loading from the flash memory bank; and, if the state is successful, starting a microprocessor to execute the microcode and entering a normal mode of operation; or, if the state is not successful, executing a download algorithm to receive microcode from a host computer interface.

20. The method of claim 19, further including executing the firmware shadowing algorithm to load data from the flash memory bank into the volatile memory area, and wherein indicating the state includes indicating the state of loading of the data to the volatile memory area.

21. The method of claim 20, wherein the data includes card information structure data.

22. The method of claim 20, wherein the data includes memory mapping data.

23. The method of claim 22, wherein the memory mapping data maps logical addresses to physical addresses such that bad blocks of the flash memory bank are mapped out.

24. The method of claim 20, wherein the data includes file attribute data.

25. The method of claim 20, wherein executing a download algorithm comprises:

indicating and signaling a PC ready;

receiving an initial microcode from the host computer interface;

executing the initial microcode;

receiving a tailored microcode from the host computer interface and storing the tailored microcode in the flash memory bank; and restarting the power up algorithm to load the tailored microcode from the flash memory bank into the volatile memory area.

26. The method of claim 25, wherein executing the initial microcode includes analyzing the flash memory bank; and sending information regarding the flash memory bank and the controller to the host computer interface.

27. The method of claim 25, wherein a host computer coupled to the host computer interface constructs the tailored microcode and data to be transmitted to the host computer interface.

28. The method of claim 19, wherein receiving the tailored microcode and storing the tailored microcode comprises:

writing a password into a password register;

erasing blocks of the flash memory bank used for storing microcode;

transferring the tailored microcode from volatile memory area into the flash memory bank.

29. A flash memory controller, comprising:

means for loading microcode and data from the flash memory into volatile memory of the controller;

means for determining whether or not microcode and data were correctly loaded into the volatile memory;

means for receiving tailored microcode and data from a host computer if the microcode and data was not correctly loaded into the volatile memory from the flash memory.

30. The controller of claim 29, wherein the means for loading includes means for receiving and executing initial microcode; and means for transferring information to the host computer.

31. The controller of claim 29, wherein the means for determining includes
- means for determining if there is an error in the microcode and data loaded from the flash memory to the volatile memory;
- means for determining if a portion of the microcode or data in the flash memory is blank.

32. The controller of claim 29, wherein the means for receiving includes
- means for transferring the microcode and data as data from the host computer into the flash memory.

33. The controller of claim 29, further including
- means for interleaved reading and writing data into the flash memory.

34. The controller of claim 29, further including
- means of protecting a portion of the flash memory from accidental overwrite, the portion of the flash memory being the portion utilized to store microcode and data utilized by the microcode.

35. A flash memory controller, comprising:
- a host interface that can couple with a host computer;
- a flash memory interface that can couple with a flash memory;
- a volatile memory area for storing microcode and data; and
- a microcontroller coupled to execute microcode stored in the volatile memory area; and
- wherein the microcode and data can be loaded into the volatile memory area through the flash memory interface, and
- wherein tailored microcode and data can be loaded into the flash memory from the host computer before the microcode is loaded into the volatile memory area from the flash memory.

36. The controller of claim 35, wherein the microcontroller executes an initial microcode received from the host computer to receive the tailored microcode from the host computer.

37. The controller of claim 36, wherein information is provided to the host computer by the controller when the initial microcode is executed.

38. The controller of claim 37, wherein the tailored microcode and data and written into the flash memory by the controller when the initial microcode is executed.

* * * * *